US011675714B2

United States Patent
Mittal et al.

(10) Patent No.: US 11,675,714 B2
(45) Date of Patent: Jun. 13, 2023

(54) MEMORY SUB-SYSTEM INCLUDING AN IN PACKAGE SEQUENCER SEPARATE FROM A CONTROLLER

(71) Applicant: Micron Technology, Inc., Boise, ID (US)

(72) Inventors: Samir Mittal, Palo Alto, CA (US); Ying Yu Tai, Mountain View, CA (US); Cheng Yuan Wu, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/392,192

(22) Filed: Aug. 2, 2021

(65) Prior Publication Data

US 2021/0365391 A1 Nov. 25, 2021

Related U.S. Application Data

(63) Continuation of application No. 16/123,907, filed on Sep. 6, 2018, now Pat. No. 11,080,210.

(51) Int. Cl.
*G06F 11/00* (2006.01)
*G06F 13/16* (2006.01)
*G06F 13/42* (2006.01)
*G06F 11/07* (2006.01)

(52) U.S. Cl.
CPC ........ *G06F 13/161* (2013.01); *G06F 11/0757* (2013.01); *G06F 13/1678* (2013.01); *G06F 13/4221* (2013.01)

(58) Field of Classification Search
CPC .............. G06F 13/161; G06F 13/1678; G06F 13/4221; G06F 11/0757; G06F 11/28; G06F 11/3419

USPC ........................................................ 714/1–57
See application file for complete search history.

(56) References Cited

U.S. PATENT DOCUMENTS

| 5,749,091 A | 5/1998 | Ishida et al. |
| 6,105,087 A | 8/2000 | Rivoir |
| 7,120,836 B1 | 10/2006 | Englin et al. |
| 7,716,542 B2 | 5/2010 | Chang et al. |
| 7,788,448 B2 | 8/2010 | Spitzer |

(Continued)

FOREIGN PATENT DOCUMENTS

| KR | 1020100072263 A | 6/2010 |
| KR | 1020110010770 A | 2/2011 |

(Continued)

OTHER PUBLICATIONS

PCT International Search Report and Written Opinion for International Application No. PCT/US2019/050049 dated Dec. 20, 2019, 2019, 9 pages.

(Continued)

*Primary Examiner* — Sarai E Butler
(74) *Attorney, Agent, or Firm* — Lowenstein Sandler LLP

(57) ABSTRACT

An instruction can be received at a sequencer from a controller. The sequencer can be in a package including the sequencer and one or more memory components. The sequencer is operatively coupled to a controller that is separate from the package. A processing device of the sequencer can perform an operation based on the instruction on at least one of the one or more memory components in the package.

20 Claims, 10 Drawing Sheets

(56) References Cited

U.S. PATENT DOCUMENTS

| | | | |
|---|---|---|---|
| 7,979,759 B2 | 7/2011 | Carnevale | |
| 9,379,846 B1* | 6/2016 | Poplack | H04L 1/0041 |
| 2002/0174382 A1 | 11/2002 | Ledford | |
| 2003/0131458 A1* | 7/2003 | Wang | H01L 21/67745 |
| | | | 29/25.01 |
| 2004/0044649 A1* | 3/2004 | Yamato | G06F 11/1469 |
| 2004/0199843 A1 | 10/2004 | Hansquine | |
| 2005/0050293 A1* | 3/2005 | Falk | G01S 19/246 |
| | | | 711/E12.005 |
| 2005/0050302 A1* | 3/2005 | Henkel | G06F 9/3836 |
| | | | 712/E9.046 |
| 2005/0081080 A1* | 4/2005 | Bender | H04L 41/0668 |
| | | | 714/2 |
| 2006/0047999 A1 | 3/2006 | Passerini | |
| 2006/0048001 A1 | 3/2006 | Honda et al. | |
| 2006/0161763 A1 | 7/2006 | Ito et al. | |
| 2007/0180336 A1 | 8/2007 | Ito et al. | |
| 2009/0106509 A1 | 4/2009 | Shim et al. | |
| 2009/0119479 A1 | 5/2009 | Kleihorst et al. | |
| 2009/0313501 A1* | 12/2009 | Hallivuori | G07F 7/1008 |
| | | | 711/E12.008 |
| 2010/0070803 A1* | 3/2010 | Carlson | G06F 11/263 |
| | | | 714/E11.178 |
| 2010/0332909 A1* | 12/2010 | Larson | G06F 11/3476 |
| | | | 714/E11.2 |
| 2013/0151909 A1 | 6/2013 | Kikuchi | |
| 2013/0166855 A1 | 6/2013 | Batwara et al. | |
| 2014/0089726 A1 | 3/2014 | Warnes et al. | |
| 2014/0136903 A1* | 5/2014 | Hyde | G06F 11/1666 |
| | | | 711/170 |
| 2014/0136915 A1 | 5/2014 | Hyde et al. | |
| 2014/0208160 A1 | 7/2014 | Fritzsche | |
| 2015/0347048 A1 | 12/2015 | Pawlowski | |
| 2015/0363272 A1* | 12/2015 | Zheng | G06F 11/1456 |
| | | | 714/19 |
| 2016/0103732 A1 | 4/2016 | Tuers et al. | |
| 2016/0132265 A1 | 5/2016 | Yi et al. | |
| 2016/0179604 A1* | 6/2016 | Nale | G06F 13/4282 |
| | | | 714/57 |
| 2016/0232103 A1 | 8/2016 | Schmisseur et al. | |
| 2016/0303239 A1 | 10/2016 | Herslof et al. | |
| 2016/0306547 A1 | 10/2016 | Perlstein et al. | |
| 2016/0378701 A1 | 12/2016 | Niell et al. | |
| 2017/0052794 A1* | 2/2017 | Berke | G06F 9/4406 |
| 2018/0024948 A1* | 1/2018 | Tsai | G11C 7/1039 |
| | | | 710/310 |
| 2018/0189125 A1 | 7/2018 | Karlik et al. | |
| 2018/0203642 A1 | 7/2018 | Sharma et al. | |
| 2018/0203761 A1* | 7/2018 | Halbert | G06F 11/1012 |
| 2018/0276071 A1 | 9/2018 | Shimizu | |
| 2018/0341553 A1 | 11/2018 | Koudele et al. | |

FOREIGN PATENT DOCUMENTS

| | | |
|---|---|---|
| KR | 1020160122631 A | 10/2016 |
| KR | 1020160128903 A | 11/2016 |
| WO | 2011019596 A2 | 2/2011 |
| WO | 2011019596 A3 | 6/2011 |
| WO | 2018038883 A1 | 3/2018 |
| WO | 2020051528 A1 | 3/2020 |

OTHER PUBLICATIONS

International Search Report and Written Opinion for International Patent Application Serial No. PCT/US2019/050062 dated Dec. 24, 2019, 10 pages.

European Supplemental Search Report for EP Application No. EP19856634, dated Apr. 12, 2022, 11 pages.

* cited by examiner

MEMORY SUB-SYSTEM INCLUDING AN IN PACKAGE SEQUENCER SEPARATE FROM A CONTROLLER

RELATED APPLICATIONS

This application is a continuation application of co-pending U.S. patent application Ser. No. 16/123,907, filed Sep. 6, 2018, and is related to U.S. patent application Ser. No. 16/123,900, filed Sep. 6, 2018, entitled "Providing Bandwidth Expansion For A Memory Sub-System Including A Sequencer Separate From a Controller," now U.S. Pat. No. 11,061,751, each of which is incorporated by reference herein.

TECHNICAL FIELD

Embodiments of the disclosure relate generally to memory sub-systems, and more specifically, relate to a memory sub-system including an in package sequencer separate from a controller.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
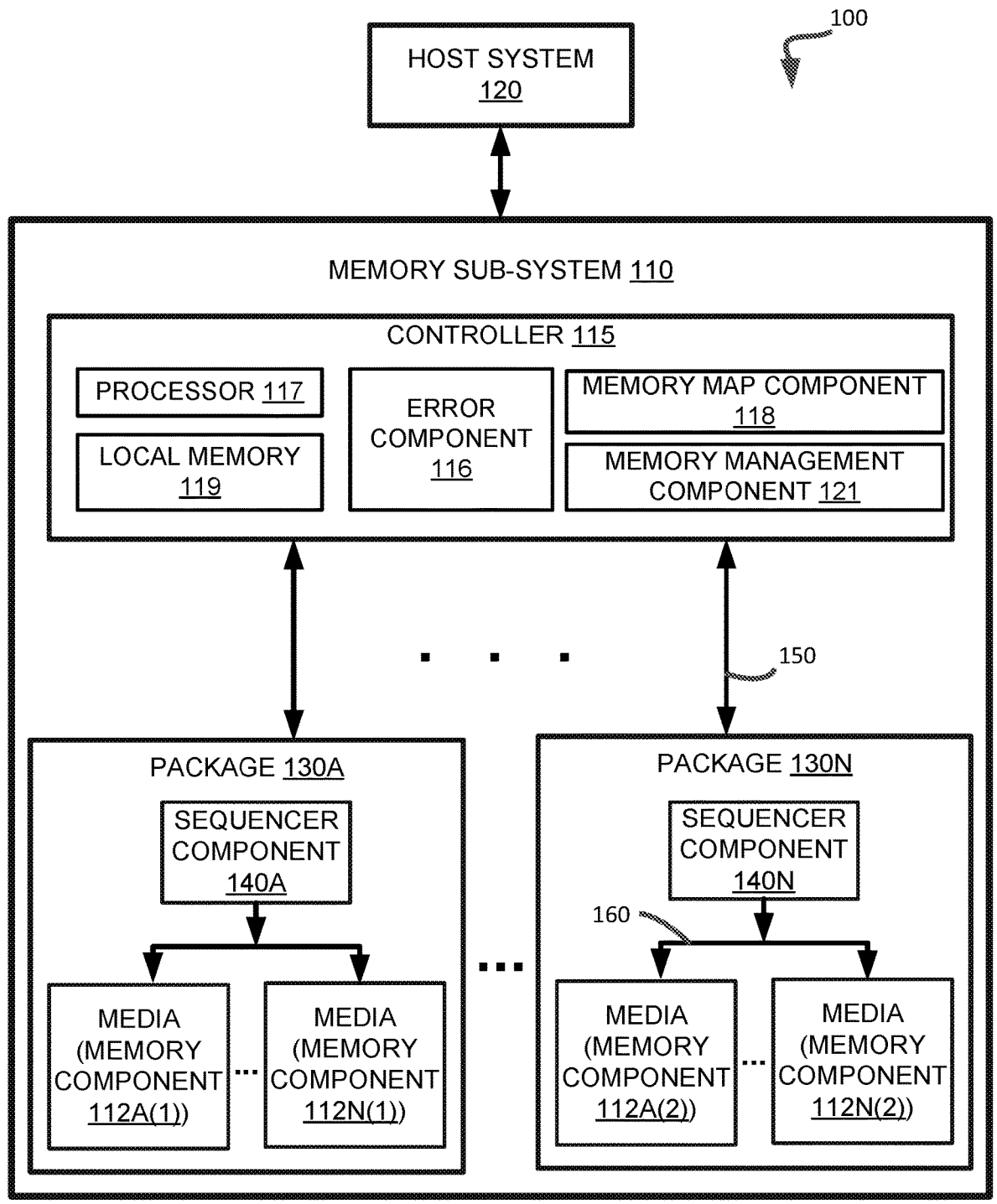
FIG. 1 illustrates an example computing environment that includes a memory sub-system in accordance with some embodiments of the present disclosure.

Aspects of the present disclosure are directed a memory sub-system including an in package sequencer separate from a controller. A memory sub-system is also hereinafter referred to as a "memory device". An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. Each memory component can include a different type of media. Examples of media include, but are not limited to, a cross-point array of non-volatile memory and flash based memory such as single-level cell (SLC) memory, triple-level cell (TLC) memory, and quad-level cell (QLC) memory. The characteristics of different types of media can be different from one media type to another media type. One example of a characteristic associated with a memory component is data density. Data density corresponds to an amount of data (e.g., bits of data) that can be stored per memory cell of a memory component. Using the example of a flash based memory, a quad-level cell (QLC) can store four bits of data while a single-level cell (SLC) can store one bit of data. Another example of a characteristic of a memory component is access speed, which corresponds to an amount of time for the memory component to access data stored at the memory component.

A memory sub-system can also include a controller operatively coupled to the memory components. The controller can operate as a "bridge" between a host system and memory components of the memory sub-system for data transmission and/or management. In some instances, the controller and the associated memory components can be manufactured by different vendors and each of the controller and/or memory components can have a respective package. To increase the capacity of the memory sub-system, memory components can be added to the memory sub-system. The controller has to interface with the multiple memory components. To interface with the memory components, in conventional systems, a controller includes a large number of pins. Including a large number of pins may increase package size of the controller, which may in turn increase the system form factor.

In some conventional systems, the controller interfaces with the host system using a Serializer/Deserializer (SerDes) connection (e.g., Serial Advanced Technology Attachment (SATA), Universal Serial Bus (USB), Peripheral Component Interconnect Express (PCIe), Universal Flash Storage (UFS), etc.) to minimize pin count. Conventional controllers can include a sequencer component that uses a protocol and timing requirements (e.g., read/write latency, etc.) specific to the memory type of the memory components to interface with and instruct the memory components. The controller can interface with memory components via a parallel interface utilizing Double Data Rate (DDR) to obtain a certain bandwidth and capacity. Increasing the number of memory components that interface directly with a controller can use more space and cause difficulty when routing the parallel interfaces. As a result, the routing paths (e.g., traces) between the controller and the memory components can be long, thereby compromising signal integrity. Further, using longer routing paths to the memory components via the parallel interface can cause loads to be larger, thereby consuming undesirable amounts of power.

Aspects of the present disclosure address the above and other deficiencies by separating the sequencer component from the controller and including the sequencer component with one or more memory components in an individual package. The sequencer component can be manufactured in an independent silicon, the memory components can be manufactured in independent die, and the independent silicon and the independent die can be included in the same package. A package may refer to a case that supports electrical contacts which connect the package to an application board and that prevents physical damage and corrosion. The application board may refer to a printed circuit board on which the controller, the package, and/or the memory components reside. Each sequencer component operates with a certain type (e.g., cross-point array, NAND flash, etc.) of memory component and can operate with multiple memory components having that type of memory. The sequencer component can interface with the memory components via a protocol specific to the memory type. Each package can include multiple sequencer components interfacing with respective differing types of memory components. Further, the memory sub-system can include multiple packages each including one or more sequencer components interfacing with one or more memory components.

The sequencer component can interface with the controller via a SerDes connection that provides higher bandwidth than a parallel interface. Further, SerDes connections use less pins than parallel connections. Thus, the pin count in the controller can be reduced using the disclosed techniques, while still accommodating the same number or more memory components included in the packages coupled to the controller. Reducing the pin count of the controller can result in a reduced form factor for the memory sub-system that includes the same capacity (e.g., same number of memory components) as previous conventional systems that included more pins.

Further, signal integrity can be improved because the distance between the sequencer component and the memory components within an independent package is shorter than the distance between the sequencer component and the memory components in conventional systems where the sequencer component is within the controller. That is, the package is smaller than an application board, and thus, the trace between the sequencer component and the memory components within the package is shorter than conventional systems where the trace runs on the application board. The shorter traces can improve the signal integrity, as well as reduce the load on the package and consume less power than conventional systems where the routing paths are longer.

In some embodiments, the sequencer component can attempt to maximize interface bandwidth between the memory components and the sequencer component by enforcing the timing requirements for the memory type of the memory components. Timing requirements may relate to latency of read/write operations performed for the memory type. The sequencer component can time when it issues the read/write commands based on the latencies for the types of the memory components. Further, the sequencer component can reorder commands based on certain rules related to the commands and addresses involved in the commands. That is, the sequencer component can reorder read/write requests by considering rules that ensure data coherency. For example, if there is a write request and then a read request to the same address, a rule can dictate that the read request cannot be moved prior to the write request because the read request would return old data. Thus, the sequencer component can reorder operations and enforce the timing of when to transmit the operations to the memory components based on the bandwidth of the memory components.

In some embodiments, the controller, which lacks the sequencer component, can perform one or more operations related to memory management, memory mapping, and/or error correction. Data received by the controller and/or results of the operations can be stored in a memory buffer of the controller. The controller can transmit the data and/or the results to the sequencer component through a number of output pins. Each operation can be tailored for the particular type of memory component included in the packages coupled to the controller via the sequencer components.

The controller can determine one or more configuration parameters to be used in the varying operations, and the one or more configuration parameters can be based on memory types of the memory components associated with the controller and coupled to the sequencer components. The memory component can determine the memory types of the memory components by receiving an indication of the memory types from a host system, accessing the memory types previously stored in a local memory of the controller, or querying the sequencer component to obtain the memory types of the memory components coupled to the sequencer component. The controller can perform the operations based on the configuration parameters specific to the memory type.

For example, one memory management operation can include performing wear leveling on the memory components in a package. Wear leveling may refer to alternating which memory component is selected to perform read and/or write operations to ensure that each memory component wears evenly. A wear leveling scheme can differ based on the type of memory component (e.g., cross-point array, flash, etc.) because of the different attributes of the memory types. Accordingly, the memory component can determine a first configuration parameter for a first wear leaving scheme for first memory components with a first memory type and a second configuration parameter for a second wear leveling scheme for second memory components with a second memory type.

In another example, an operation related to error correction can include an error correction code operation that can be used to improve the reliability of data stored in a memory sub-system. An error correction code operation can refer to a technique for expressing a sequence of data to enable errors introduced to the data to be detected and corrected based on the other remaining data. The sequence of data can be referred to as code words. Types of error correction codes can include block codes (e.g., Hamming codes, Reed Solomon codes, etc.). Typically, an encoder encodes the data to be written with additional data bits to form a code word and portions of the code word can be distributed across the memory components of a memory sub-system (e.g., striped). When the data is to be read, a decoder decodes the code word by removing the additional data bits and providing the desired original data.

The configuration parameter for the error correction code operation can include error correction code parameters (e.g., encoding/decoding) for the memory type of the memory components. The controller can receive data from the host system and generate a code word for the data by using the error correction code operation based on the configuration parameter. Subsequently, the code word can be sent to the sequencer component external to the controller, and the sequencer component can distribute the code word according to the timing requirements and rules described above.

In another example, one memory mapping operation can include performing address translation. A host system can utilize an address space that is different than the actual physical address space of the memory components. Thus, the memory component can determine a configuration parameter to be used in the memory mapping operation for the memory type of the memory components. The memory component can perform logical address mapping to physical address mapping based on the configuration parameter for the type of memory component involved in the operations. The memory component can send the physical addresses in the commands to the sequencer.

In another embodiment, the controller can determine a configuration parameter for an operation performed by the sequencer component, and send the configuration parameter to the sequencer component. The configuration parameter can include timing requirements for the memory type of the memory components coupled to the sequencer component. As described above, the sequencer component can time when to issue commands to the memory components (e.g., read/write operations) based on the timing requirements for the memory types of the memory components.

FIG. 1 illustrates an example computing environment 100 that includes a memory sub-system 110 in accordance with some embodiments of the present disclosure. The memory sub-system 110 can include media, such as memory components 112. The memory components 112 can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system.

In some embodiments, the memory components 112 can be included in separate respective packages 130A to 130N. As depicted, the memory components 112A(1) to 112N(1) are coupled to a first sequencer component 140A in a first package 130A and the memory components 112A(2) to 112N(2) are coupled to another sequencer component 140N in another package 130N. Each of the sequencer components 140A to 140N can be manufactured in independent silicon and each of the memory components 112 can be manufactured in independent die. In conventional memory sub-systems, the sequencer component 140 is typically located within a memory system controller 115 (hereinafter referred to as "controller"). The sequencer components 140 and respective memory components 112 can be included in a single package and coupled via short traces 160 to improve performance of issuing commands from the sequencer component 140 to the memory components 112. Power load consumption can be reduced and data signal integrity can be increased by using shorter traces between the sequencer component 140 and the memory components as opposed to conventional arrangements. Also, as discussed herein, moving the sequencer component 140 to a package 130 separate from the controller 115 can provide numerous other benefits, such as reducing the form factor of the memory sub-system 110, increasing bandwidth between the controller 115 and the memory components 112, and so forth.

For example, the sequencer components 140 and memory components 112 in the packages 130 can be coupled to the controller 115 via a SerDes interface 150, as opposed to a parallel interface. A SerDes interface 150 provides higher bandwidth than a parallel interface, and also uses less outgoing pins, thereby reducing the number of pins needed for the controller 115 to provide a memory sub-system 110 with the same capacity (e.g., number of memory components 112). For instance, a SerDes interface can use six pins (e.g., two for clock, two for transmit, two for receive), whereas a parallel interface can use more than twenty pins to operate. Reducing the outgoing pin count of the controller 115 can improve the form factor of the entire memory sub-system 110 by reducing the size of the controller 110. Further, removing the sequencer component 140 from the controller 115 can also reduce the size of the controller 115.

The sequencer component 140A to 140N can perform one or more operations and can be configured based on the type of memory component 112 to which respective sequencer component is coupled. For example, the sequencer component 140A can receive various data from the controller 115 and schedule when to issue read/write commands to the attached memory components 112A(1) to 112A(1) based on timing requirements of the type of attached memory components 112A(1) to 112A(1) and certain rules for ensuring data coherency, etc. In some embodiments, one sequencer component 140 is coupled to memory components 112 that having a single memory type. There can be numerous sequencer components 140 included in each package 130, and thus, a single package 130 can include memory components 112 having different types that are coupled to different respective sequencer components 140 within the package 140. In additional embodiments, each package 140 can include memory components 112 having a single memory type, and thus, each package 130 can be dedicated to providing operational characteristics associated with the type of memory components 112 being used.

In general, the computing environment 100 can include a host system 120 that uses the memory sub-system 110. For example, the host system 120 can write data to the memory sub-system 110 and read data from the memory sub-system 110. The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a Serial/Deserial (SerDes) interface, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112 can include any combination of the different types of non-volatile memory components and/or volatile memory components. An example of non-volatile memory components includes a negative-and (NAND) type flash memory. Each of the memory components 112 can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112 can be based on any other type of memory such as a volatile memory. In some embodiments, the memory components 112 can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112 can be grouped as memory pages or data blocks that can refer to a unit of the memory component used to store data.

The controller 115 can communicate with the memory components 112 via the sequencer components 140 to perform operations such as reading data, writing data, or erasing data at the memory components 112 and other such operations. In one example, and as discussed further below, the controller 115 can include an error component 116. Error correction codes can be used to improve the reliability of data stored in the memory sub-system 110. An error correction code can refer to a technique for expressing a sequence of data to enable errors introduced to the data to be detected and corrected based on the other remaining data. The sequence of data can be referred to as code words. Types of error correction codes can include block codes (e.g., Hamming codes, Reed Solomon codes, etc.).

The error component 116 can perform an error correction code encoding operation that encodes data received by the host system 120 with additional data bits (e.g., parity bits) to form a code word to be written to the memory components 112 via the sequencer component 140. The error component 116 can also perform an error correction code decoding operation that decodes the code word by removing the additional data bits. The encoding/decoding operations can use certain configuration parameters that are based on the type of the memory components 112 on which the data is to be stored. The controller 115 can send one or more code words to the sequencer component 140A. The sequencer component 140A can determine which portions of which code words to store on the memory components 112A(1) to 112N(1) by considering the bandwidth and availability of the memory components 112A(1) to 112N(1), timing requirements (e.g., read/write latency) of the memory components 112A(1) to 112N(1), and rules regarding sequencing of read/write operations. One purpose of the sequencer component 116 can be to maximize the interface bandwidth between the sequencer component 116 and the memory components 112A(1) to 112N(1).

The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112. The controller 115 can include the error component 116 to perform error correction code operation, a memory map component 118 to perform address translations between a logical block address and a physical block address that are associated with the memory components 112, and a memory management component 121 that performs wear leveling operations. The processing device 117 can execute the various components 116, 118, and 121. Also, the various components 116, 118, and 121 can use configuration parameters that are specific to the types of memory components 112 included in the memory sub-system 110. The configuration parameters can be received from the host system 120, can be pre-stored in the local memory 119 during the manufacturing process, and/or can be fetched from the packages 130 via the sequencer components 140 by querying what type of memory components 112 are included in the packages 130. In some instances, the sequencer component 140 can provide a notification indicating the type of memory components 112 with which it is associated. Further details with regards to the operations of the error component 116, the memory map component 118, and the memory management component 121 are described below.

The controller 115 can be responsible for other operations such garbage collection operations, encryption operations, and/or caching operations. The controller 115 can further include host interface circuitry to communicate with the host system 120 via the physical host interface. The host interface circuitry can convert the commands received from the host system into command instructions to access the memory components 112 via the sequencer components 140A to 140N, as well as convert responses associated with the memory components 112 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112.

Figure 2:
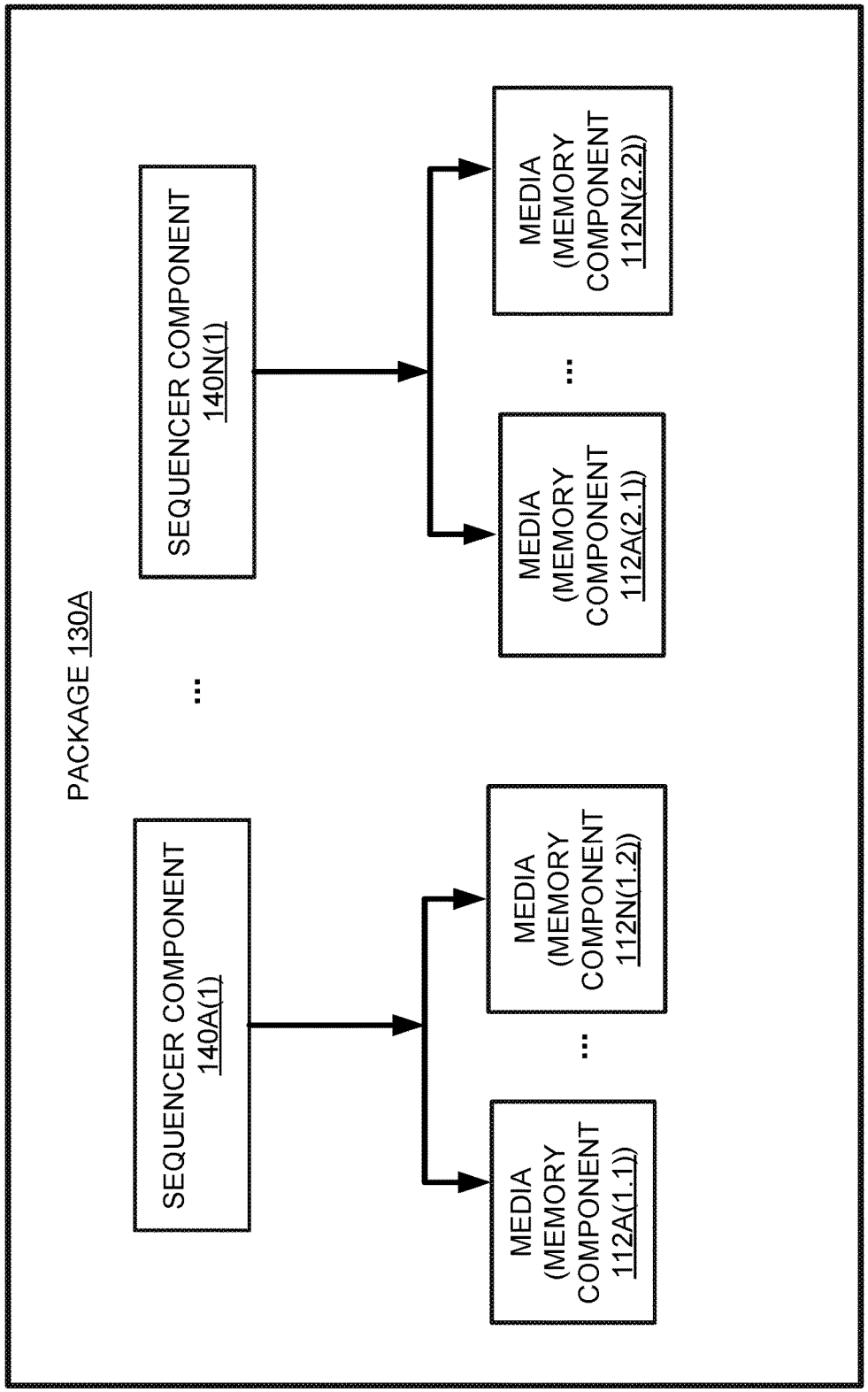
FIG. 2 illustrates an example package including multiple sequencers operatively coupled to different memory components having different memory types in accordance with some embodiments of the present disclosure.

FIG. 2 illustrates an example package 130A including multiple sequencer components 140 operatively coupled to different memory components 112 having different memory types in accordance with some embodiments of the present disclosure. As depicted, a first sequencer component 140A (1) is coupled to first memory components 112A(1.1) to 112N(1.2) having a first memory type (e.g., NAND flash), and a second sequencer component 140N(1) is coupled to second memory components 112A(2.1) to 112N(2.2) having a second memory type (e.g., cross-point array). It should be understood that any number of sequencer components coupled to respective memory components having respective memory types can be included in the packages 130 to meet desired performance attributes of the packages 130.

Figure 3:
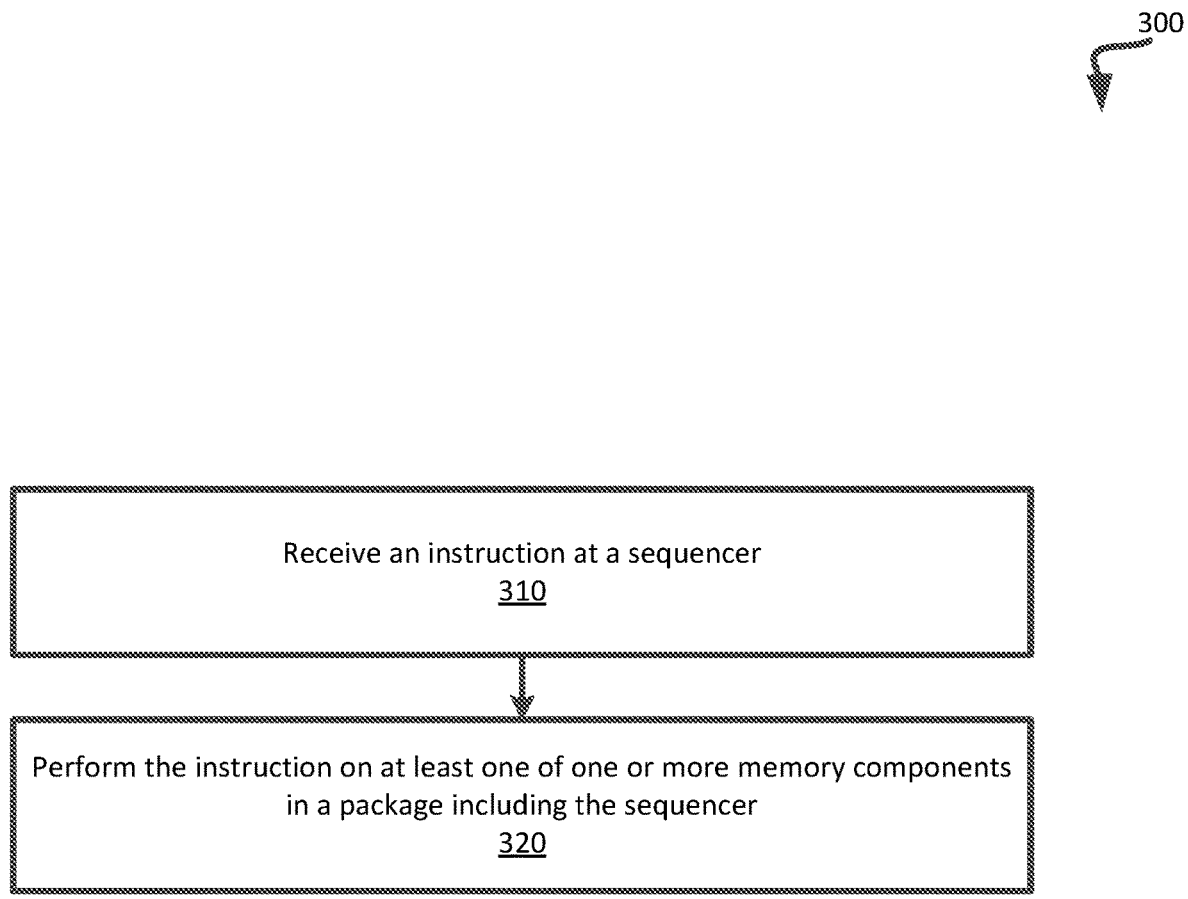
FIG. 3 is a flow diagram of an example method for performing an instruction in accordance with some embodiments of the present disclosure.

FIG. 3 is a flow diagram of an example method 300 for performing an instruction in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the sequencer component 140A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 310, the processing device receives an instruction at the sequencer component 140A. The instruction can be received from the controller 115. The sequencer component 140A can be located in the package 130A that includes the sequencer component 140A coupled to the one or more memory components 112A(1) to 112N(1). The sequencer component 140A can be manufactured in its own independent silicon, the memory components 112A(1) to 112N(1) can be manufactured in their own independent die, and the independent silicon and the independent die can be included in the package 130A. The sequencer component 140A can be coupled to the controller 115 that is separate from the package 130A. The sequencer component 140A can be coupled to the controller 115 via a SerDes interface. The traces between the sequencer component 140A and the memory components 112A(1) to 112N(1) can be shorter than a trace between the sequencer component 140A and the controller 115.

At block 320, the processing device of the sequencer component 140A performs an operation based on the instruction on at least one of the one or more memory components 112A(1) to 112N(1). The operation can include interfacing with the one or more memory components 112A(1) to 112N(1) via a protocol specific to the type of memory components 112A(1) to 112N(1), enforcing operation timing requirements for the one or more memory components 112A(1) to 112N(1) based on the type of the memory components 112A(1) to 112N(1), and reordering operations based on rules related to data coherency.

In some embodiments, the processing device can enforce timing requirements for when to issue commands based on read/write latency of the various memory components 112A (1) to 112N(1). For example, if it the latencies of how long it takes the memory components 112A(1) to 112N(1) to perform operations is determined, the processing device can schedule when to issue subsequent commands to the memory components 112A(1) to 112N(1). In some instances, the latencies can be determined from configuration parameters. In another instance, the processing device can determine the latencies dynamically. Further, if the latencies change during use of the memory components, the processing device can account for the change when issuing further commands. The processing device can enforce the timing requirements to maximize the bandwidth between the sequencer component 140A and the memory components 112A(1) to 112N(1).

Further, the processing device can reorder operations based on rules related to the commands and addresses involved in the instruction received from the controller 115. In general, the processing device can reorder the read and write operations to maximize the bandwidth between the sequencer component 140A and the memory components 112A(1) to 112N(1). For example, if there is a read operation received for a first address but the memory component 112A(1) including that address is busy, then the read operation can be moved with another operation that can execute sooner to improve performance. The reordering can be performed if the reordering satisfies the rules. For example, an instruction can specify a write and a read at the same address of a memory component 112A(1). In such an instance, a rule can specify that the operations cannot be reordered, because if the read operation were reordered to be first, then the read operation would provide old data before the write operation updates the data.

In some embodiments, a second sequencer component 140N can receive a second instruction. The second sequencer component 140N can be located in another package 140N, and the second sequencer component 140N can be operatively coupled to one or more second memory components 112A(2) to 112N(2) within the second package 130N. The second sequencer component 140N can be operatively coupled to the controller 115. The memory components 112A(2) to 112N(2) in the second package 130N can include a memory type that is different than the memory components 112A(1) to 112N(1) in the package 130A. The second sequencer component 140N can interface with the second memory type via a protocol specific to the second memory type.

Figure 4:
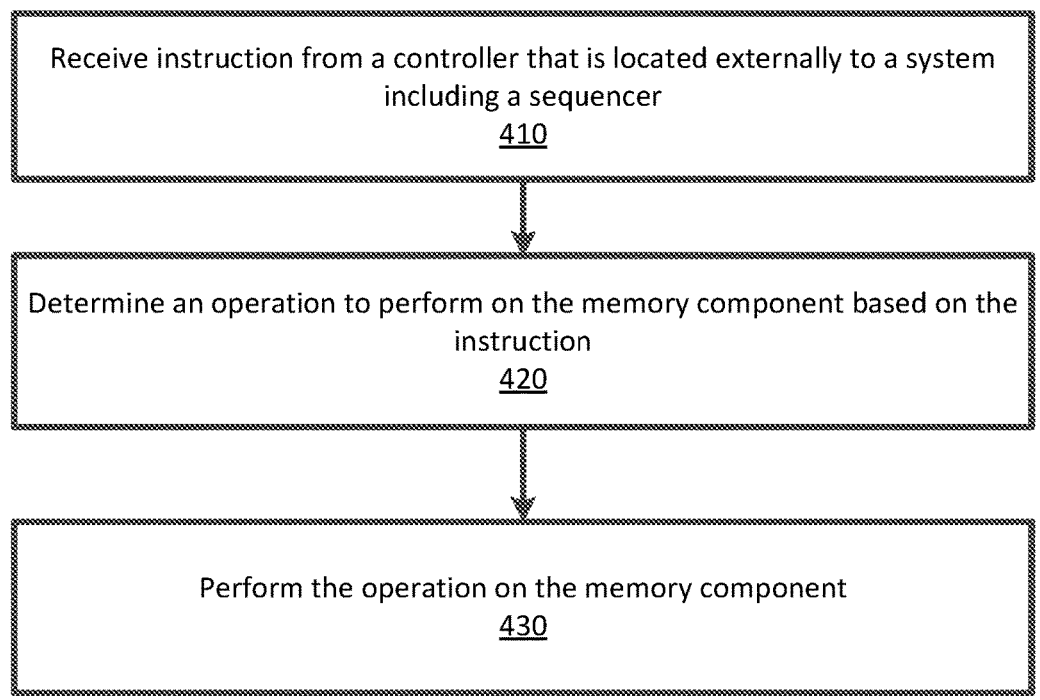
FIG. 4 is a flow diagram of an example method for performing an operation on a memory component in accordance with some embodiments of the present disclosure.

FIG. 4 is a flow diagram of an example method for performing an operation on a memory component in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the sequencer component 140A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, the processing device of a sequencer component 140A receives an instruction from a controller 115 that is located externally to a system including the sequencer component 140A. In some embodiments, the system can be the package 130A. The package 130A can include the sequencer component 140A operatively coupled to a memory component 112A(1). The sequencer component 140A can be operatively coupled to the controller 115 that is external to the package 130A. In some embodiments, the trace between the sequencer component 140A and the memory component 112A(1) can be shorter than the trace between the controller 115 and the sequencer component 140A. The sequencer component 140A and the controller 115 can be coupled via a SerDes interface.

At block 420, the processing device determines an operation to perform on the memory component 112A(1) based on the instruction. The instruction can be to write data to or read data from a physical address of the memory component 112A(1). For example, the instruction can include a code word and the operation can include dividing the code word into portions and issuing commands to store the portions on one or more data blocks of the memory component 112A(1). The code word can be encoded by the controller 115 based on configuration parameters specific to the type of memory component 112A(1) that is included in the package 130A. The processing device can determine timing of when to perform the operation based on timing requirements for the memory type of the memory component 112A(1).

At block 430, the processing device performs the operation on the memory component 112A(1). For example, the processing device can cause the memory component 112A(1) to write the portions of the code word to the one or more data blocks of the memory component 112A(1).

In some instances, prior to performing the operation, the processing device can also receive a second instruction from the controller 115 that is external to the system. The processing device can determine a second operation to perform on the memory component 112A(1) based on the second instruction. The processing device can determine that the second operation is to be performed prior to the operation based on a rule. For example, the first instruction can be associated with a read operation to an address and the second instruction can be associated with a write operation to the address. The rule can specify that the write operation be performed prior to the read operation such that the read operation returns current data. The processing device can then perform the second operation on the memory component 112A(1) prior to the operation and then perform the operation on the memory component 112A(1).

Figure 5:
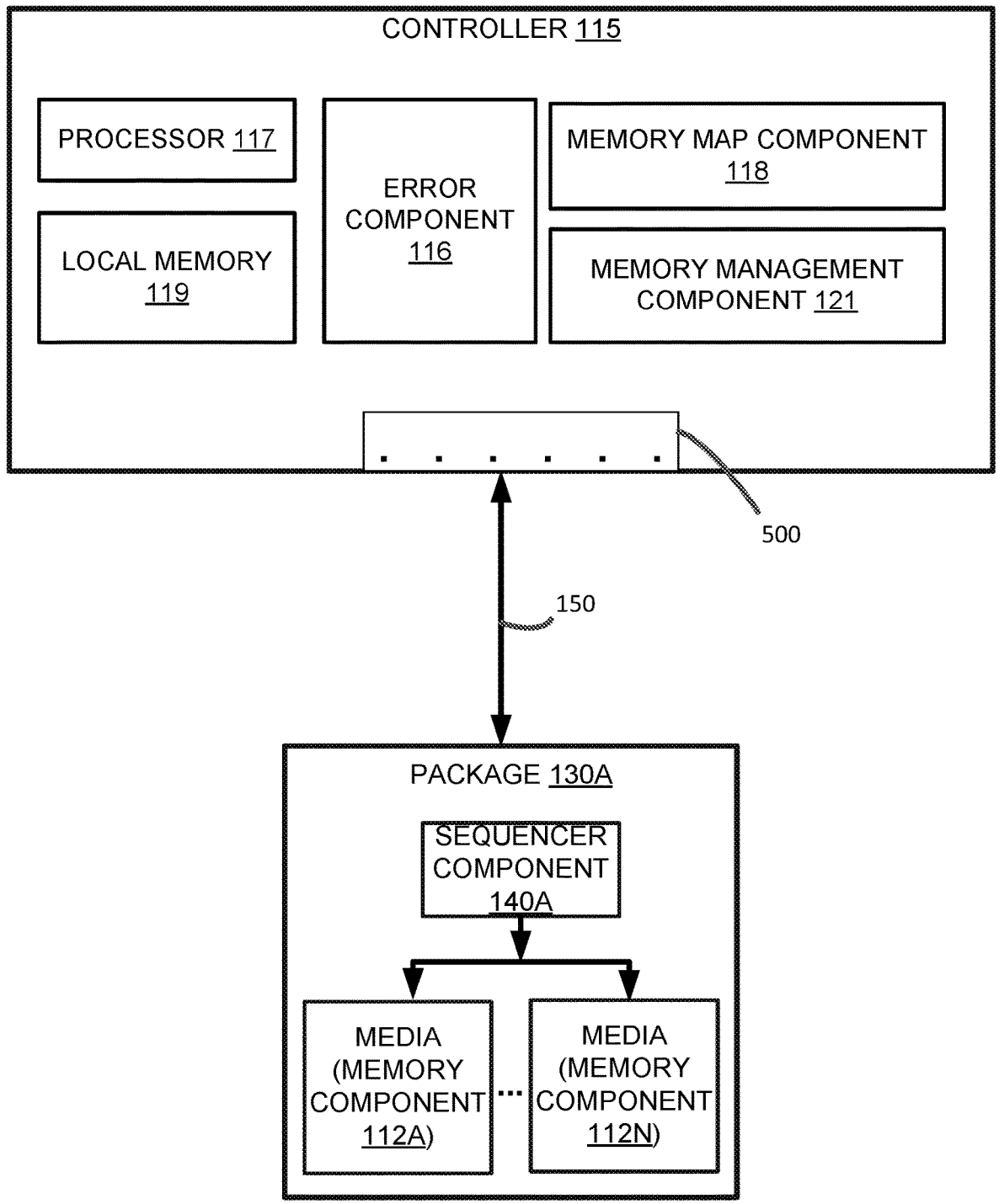
FIG. 5 illustrates a controller including a reduced number of pins and a reduced form factor in accordance with some embodiments of the present disclosure.

FIG. 5 illustrates a controller 115 including a reduced number of pins 500 and a reduced form factor in accordance with some embodiments of the present disclosure. The controller is coupled to the package 130A via the connection 150, which in some embodiments can be a SerDes interface. As described above, SerDes interfaces can use approximately six outgoing pins of the controller 115 to communicate with the sequencer component 140A. The six outgoing pins can include two for clock, two for transmit, and two for receive. It should be appreciated that, in conventional systems, a parallel interface with twenty or more pins is typically used to connect the controller 115 to memory components 112. However, embodiments of the present disclosure can use a SerDes interface by moving the sequencer component 140A to a package 130A with the memory components 112A to 112N and connecting the controller 115 to the memory components 112A to 112N indirectly through the sequencer component 140A. As a result, the bandwidth between the controller 115 and the memory components 112A to 112N can be increased using the SerDes interface 150, the size of the controller 115 can be reduced due to the reduced number of pins 500, and the form factor of the memory sub-system 110 can be reduced, among other things.

Figure 6:
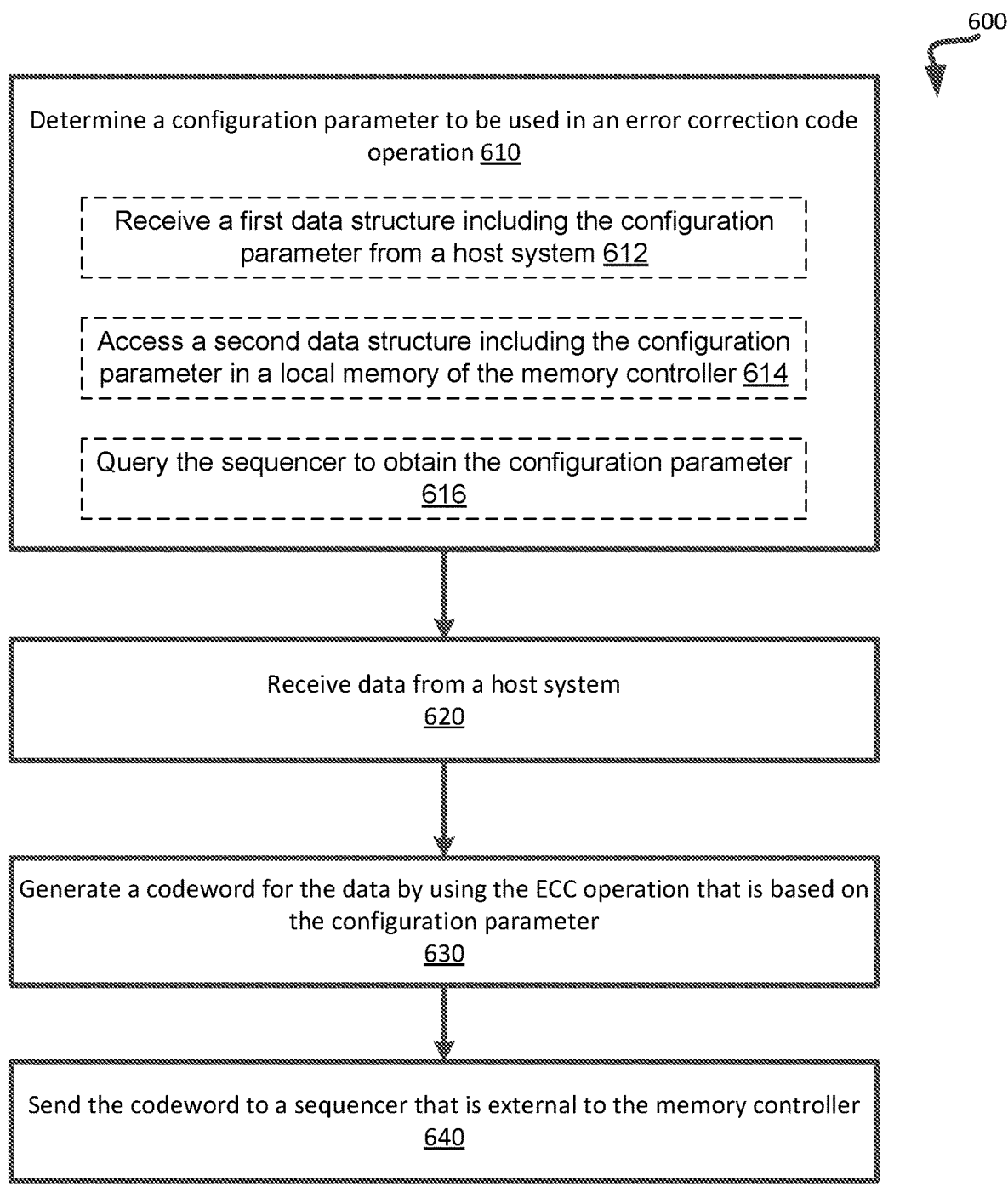
FIG. 6 is a flow diagram of an example method for determining a configuration parameter to be used in an error correction code operation in accordance with some embodiments of the present disclosure.
Figure 7:
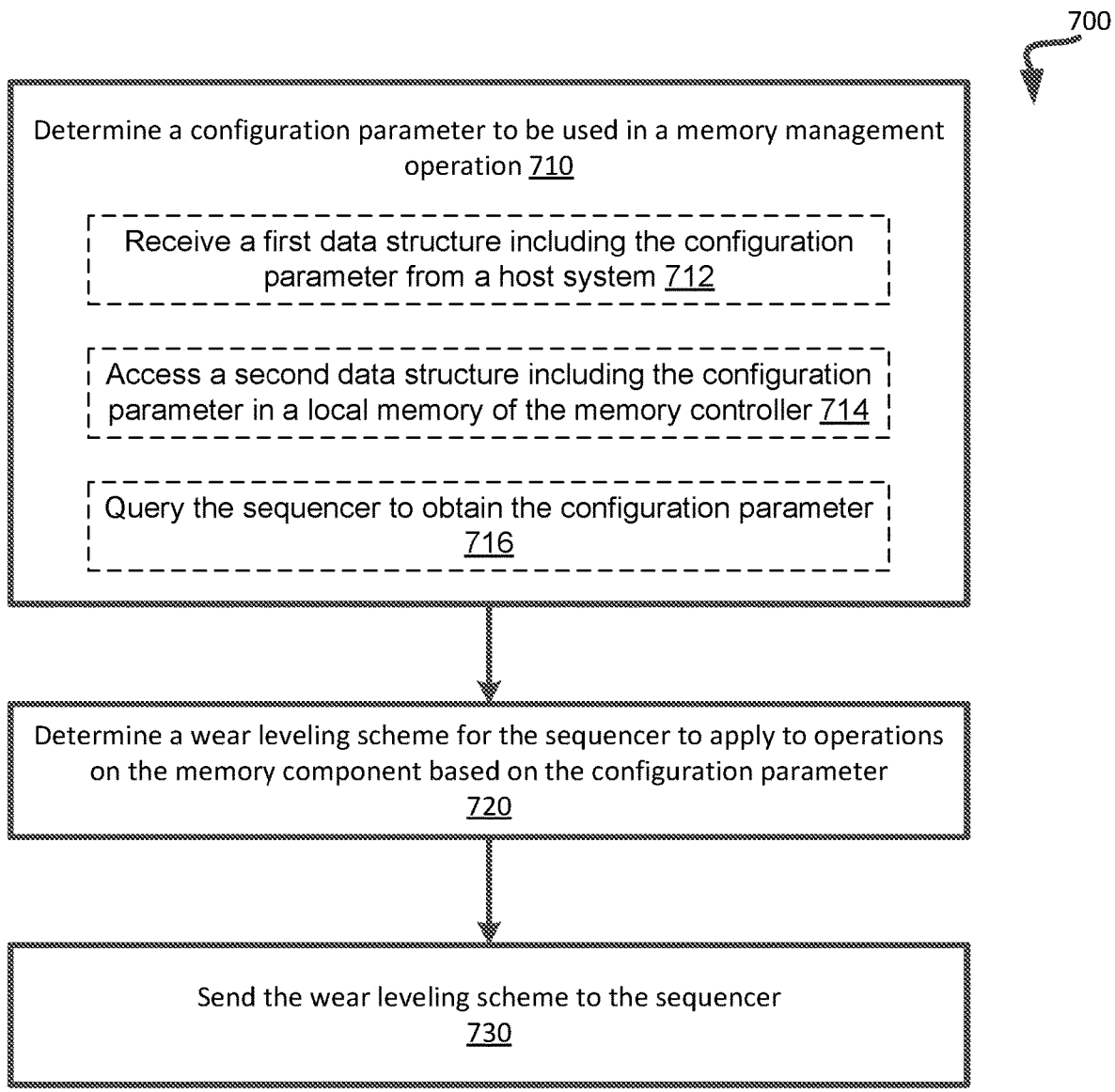
FIG. 7 is a flow diagram of an example method for determining a configuration parameter to be used in a memory management operation in accordance with some embodiments of the present disclosure.
Figure 8:
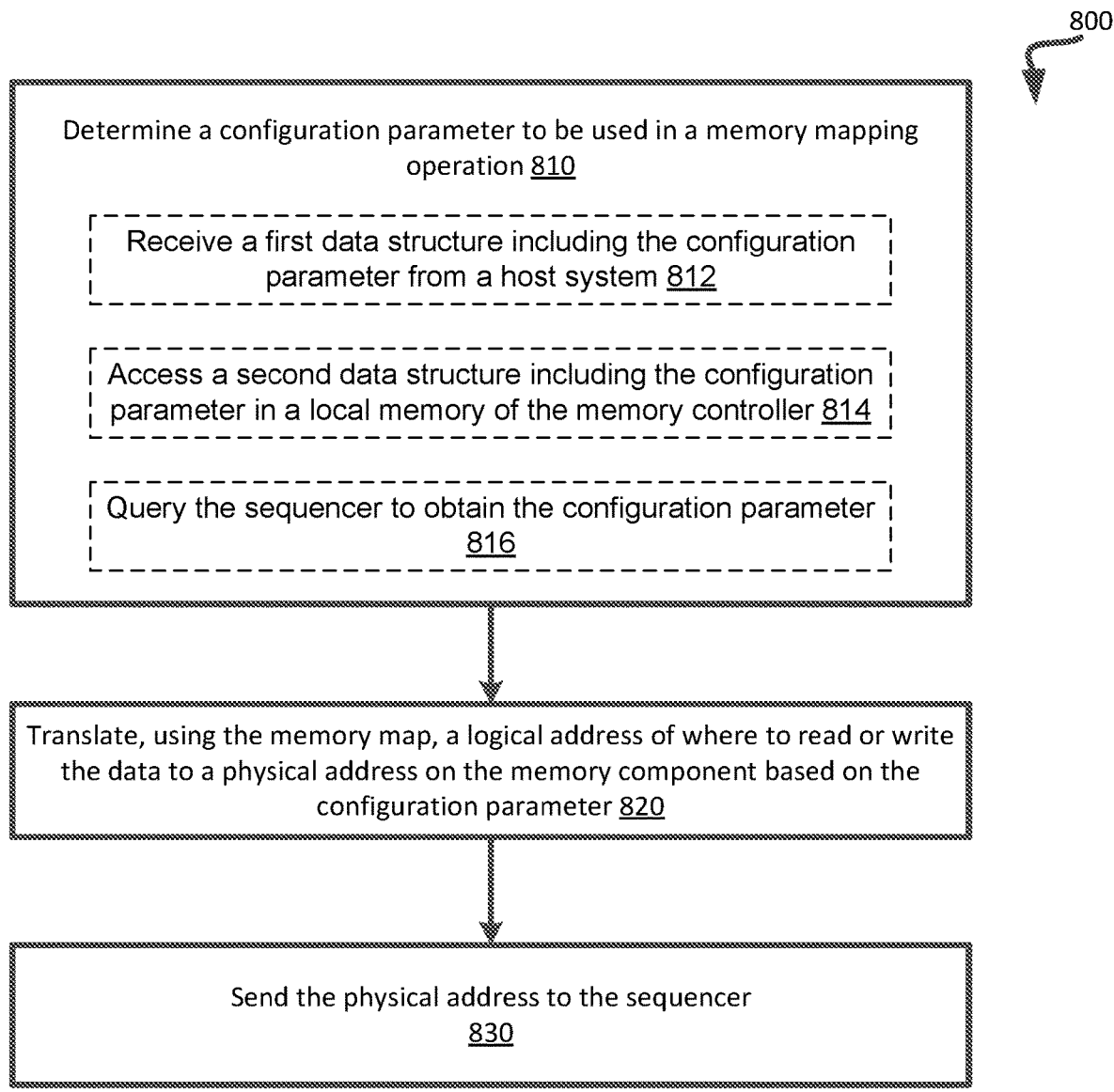
FIG. 8 is a flow diagram of an example method for determining a configuration parameter to be used in a memory mapping operation in accordance with some embodiments of the present disclosure.
Figure 9:
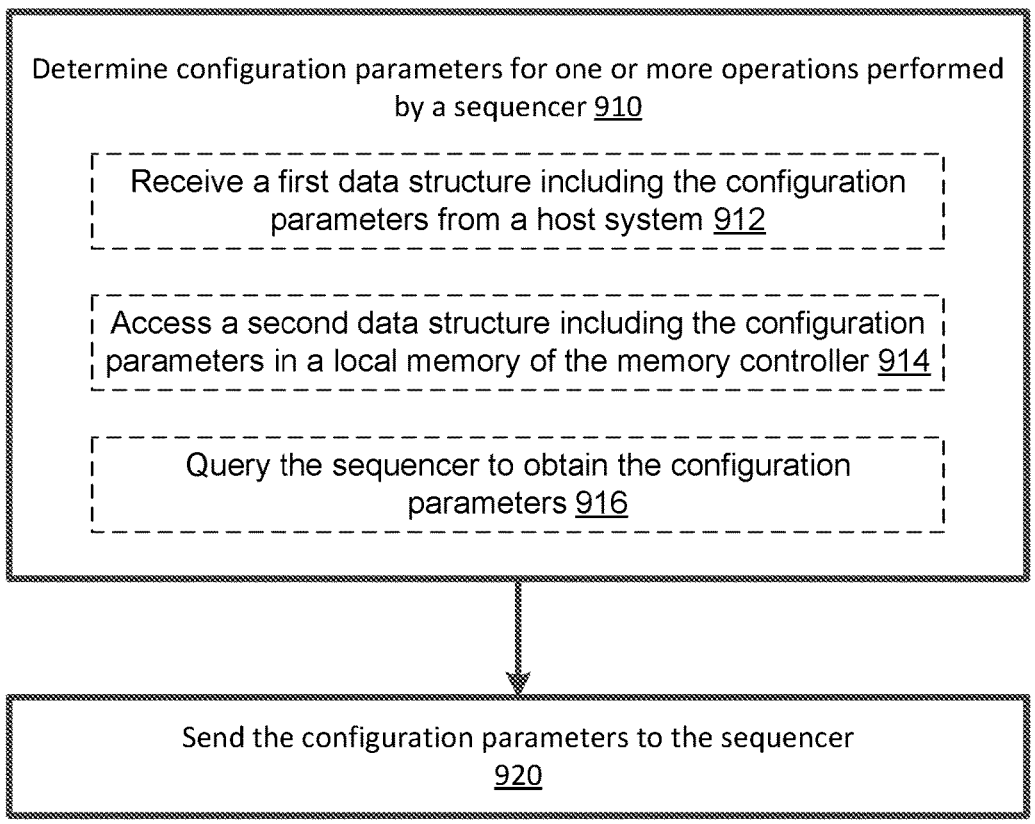
FIG. 9 is a flow diagram of an example method for determining configuration parameters for sequencer operations and to send the configuration parameters to a sequencer in accordance with embodiments of the present disclosure.

As depicted, the controller 115 includes the error component 116, the memory map component 118, and the memory management component 121. The various components 115, 116, and 121 can perform various operations that are based on configuration parameters specific to the type of the memory components 112A to 112N included in the package 130. FIGS. 6-8 generally relate to the controller 115 performing different operations using the configuration parameter for the specific type of memory components 112A to 112N. Additionally, the controller 115 can determine the type of memory components that are included in the package 130A and can provide configuration parameters related to timing requirements of the particular memory type to the sequencer component 140A. FIG. 9 generally relates to the controller determining and transmitting the configuration parameters to the sequencer component 140A.

FIG. 6 is a flow diagram of an example method 600 for determining a configuration parameter to be used in an error correction code operation in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the error component 116 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 610, the processing device determines a configuration parameter to be used in an error correction code (ECC) operation. The configuration parameter is based on a memory type of a memory component 112A(1) that is associated with the controller 115. The memory component 112A(1) can be included in a package 130A along with a sequencer component 140A. The sequencer component 140A and the memory component 112A(1) can be communicatively coupled. The controller 115 can be coupled via a SerDes interface with the sequencer component 140A that is external to the controller 115. The controller 115 can issue instructions to the sequencer component 140A, and the sequencer component 140A can determine various operations to perform on the memory component 112A(1) associated with the controller 115.

The processing device can determine the configuration parameter in a number of ways. For example, in block 612, the processing device can receive a first data structure (e.g., a table) including the configuration parameters for one or more types of memory components 112 from the host system 120. In some embodiments, the processing device can be notified by the sequencer component 140A regarding the type of memory components 112A to 112N included in the package 130A. In another embodiment, the sequencer component 140A can request the sequencer component 140A to provide the type of memory components 112A to 112N included in the package 130A. The processing device can search the first data structure using the type of memory components 112A to 112N to determine the configuration parameter to be used in the error correction code operation. In particular, the configuration parameter can relate to an encoding/decoding scheme used, which can change based on the type of memory component used.

Another way to determine the configuration parameter is shown in block 614, where the processing device can access a second data structure including the configuration parameter in the local memory 119. The second data structure can be stored in the local memory 119 after the controller 115 is manufactured and when initial settings and data are loaded to the controller 115. In some embodiments, the second data structure can be stored in the local memory 119 during an update of software, firmware, or the like. Similar to described above, the processing device can search the second data structure for the type of memory components 112A to 112N used and determine the configuration parameter to be used in the error correction code operation.

Yet another way to determine the configuration parameter is shown in block 616, where the processing device can query the sequencer component 140A to obtain the configuration parameter. For example, the sequencer component 140A can receive the request from the controller 115 and determine the configuration parameter by searching a local memory of the package 130A or based on attributes of the memory components 112A to 112N known by the sequencer component 140A. The sequencer component 140A can provide the configuration parameter to be used in the error correction code operation to the controller 115.

At block 620, the processing device receives data from the host system 120. The data can include data that the host system 120 requests to be stored in the memory sub-system 110. In one example, the data can be user data.

At block 630, the processing device generates a code word for the data by using the ECC operation that is based on the configuration parameter. As noted above, the configuration parameter can include ECC parameters for the memory type of the memory components 112A to 112N in the package 130A. The ECC parameters can specify the encoding/decoding scheme to apply to the data during the ECC operation. It should be understood that the controller 115 can be associated with more than one memory component and the other memory components can be of differing types. Using the disclosed techniques, the controller 115 can determine the configuration parameter to be used in the ECC operation for each type of associated memory component and can perform the ECC operation using the respective configuration parameter.

At block 640, the processing device sends the code word to the sequencer component 140A that is external to the controller 115. In some instances, the code word to be written can be stored in the local memory 119 (e.g., memory buffer), and the processing device can transmit the code word stored at the memory buffer to the sequencer component 140A through the output pins of the controller 115 via a SerDes interface.

In some embodiments, the controller 115 can request to read the code word from the sequencer component 140A. The sequencer component 140A can provide the code word and the controller 115 can decode the code word based on the determined configuration parameter. The decoded data can be transmitted by the controller 115 to the host system 120 in some instances.

FIG. 7 is a flow diagram of an example method 700 for determining a configuration parameter to be used in a memory management operation in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the memory management component 121 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 710, the processing device determines a configuration parameter to be used in a memory management operation. The configuration parameter is based on a memory type of a memory component 112A(1) that is associated with the controller 115. In one example, the configuration parameter to be used in the memory management operation can relate to a wear leveling scheme for the particular type of the memory component 112A(1). The memory component 112A(1) can be included in a package 130A along with the sequencer component 140A. The sequencer component 140A and the memory component 112A(1) can be communicatively coupled. The controller 115 can be coupled via a SerDes interface with the sequencer component 140A that is external to the controller 115. The controller 115 can issue instructions to the sequencer component 140A, and the sequencer component 140A can determine various operations to perform on the memory component 112A(1) associated with the controller 115.

The processing device can determine the configuration parameter to be used in the memory management operation in a number of ways, similar to how the configuration parameter to be used in the ECC operation is determined with reference to FIG. 6. For example, in block 712, the processing device can receive a first data structure (e.g., a table) including the configuration parameter to be used in the memory management operation for the specific type of the memory component 112A(1) from the host system 120. In another example, in block 714, the processing device can access a second data structure including the configuration parameter to be used in the memory management operation in the local memory 119. In yet another example, in block 716, the processing device can query the sequencer component 140A to obtain the configuration parameter to be used in the memory management operation. Additionally or alternatively, in some embodiments, the processing device can query the sequencer component 140A for the type of the memory component 112A(1), and use the received response with any of the above techniques described.

At block 720, the processing device determines a wear leveling scheme for the sequencer component 140A to apply to operations on the memory component 112A(1) based on the configuration parameter. Certain types (e.g., cross point array, NAND flash, etc.) can include different attributes, such as a degradation rate of the physical media as operations are performed. Using the configuration parameter for the type of the memory component 112A(1), the processing device can determine a wear leveling scheme that evenly distributes read/write operations, disproportionately distributes read operations or write operations, or some combination thereof, to different data blocks of the memory component 112A(1) and/or of the memory components 112A(1) to 112N(1) to ensure that the wear for operations is distributed to enhance the lifetime of the memory components 112A(1) to 112N(1).

At block 730, the processing device sends the wear leveling scheme and/or data to the sequencer component 140A. The wear leveling scheme may refer to a schedule of which memory components to use for performing operations, or actual instructions to perform operations on certain memory components to carry out the wear leveling. In some instances, the wear leveling scheme and/or any data to be written can be stored in the local memory 119 (e.g., memory buffer), and the processing device can transmit the wear leveling scheme and/or the data stored at the memory buffer to the sequencer component 140A through the output pins of the controller 115.

The sequencer component 140A can use the wear leveling scheme when scheduling which memory components 112A(1) to 112N(1) to use for certain operations and when to perform the operations on the memory components 112A(1) to 112N(1). Tailoring the wear leveling scheme for the types of memory components 112 provides a flexible architecture where different types of memory components 112 can be used based on their desired performance traits while still maximizing the memory components 112 endurance.

FIG. 8 is a flow diagram of an example method 800 for determining a configuration parameter to be used in a memory mapping operation in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the memory mapping component 118 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 810, the processing device determines a configuration parameter to be used in a memory mapping operation. The configuration parameter is based on a memory type of a memory component 112A(1) that is associated with the controller 115. In one example, the configuration parameter to be used in the memory mapping operation can include a memory map with physical addresses for the particular type of the memory component 112A(1). The memory component 112A(1) can be included in a package 130A along with the sequencer component 140A. The sequencer component 140A and the memory component 112A(1) can be communicatively coupled. The controller 115 can be coupled via a SerDes interface with the sequencer component 140A that is external to the controller 115. The controller 115 can issue instructions to the sequencer component 140A, and the sequencer component 140A can determine various operations to perform on the memory component 112A(1) associated with the controller 115.

The processing device can determine the configuration parameter to be used in the memory mapping operation in a number of ways, similar to how the configuration parameter to be used in the ECC operation is determined with reference to FIG. 6. For example, in block 812, the processing device can receive a first data structure (e.g., a table) including the configuration parameter to be used in the memory mapping operation for the specific type of the memory component 112A(1) from the host system 120. In another example, in block 814, the processing device can access a second data structure including the configuration parameter to be used in the memory mapping operation in the local memory 119. In yet another example, in block 816, the processing device can query the sequencer component 140A to obtain the configuration parameter to be used in the memory mapping operation. Additionally or alternatively, in some embodiments, the processing device can query the sequencer component 140A for the type of the memory component 112A(1), and use the received response with any of the above techniques described.

At block 820, the processing device translates, using the memory map, a logical address of where to read or write data to a physical address on the memory component 112A(1) based on the configuration parameter. In some embodiments, the host system 120 can send the data to the controller 115 and the data can include the logical address of where the data was stored in the host system 120. Using the memory map, the processing device can translate the logical address to a physical address in the memory component 112A(1).

At block 830, the processing device sends the physical address and/or the data to the sequencer component 140A. In some instances, the physical address and/or the data can be stored in the local memory 119 (e.g., memory buffer), and the processing device can transmit the physical address and/or the data stored at the memory buffer to the sequencer component 140A through the output pins of the controller 115.

The sequencer component 140A can use the physical address to write the data to the memory component 112A(1). As can be appreciated, different types of memory components 112 can have different physical addresses. Thus, enabling the memory mapping component 118 to translate the logical address to any physical address specific to a target memory component 112 can provide the benefit of using differing types of memory components 112 in the memory sub-system 110 based on the desired performance of the memory sub-system 110.

FIG. 9 is a flow diagram of an example method 900 for determining configuration parameters for sequencer component operations and to send the configuration parameters to a sequencer component in accordance with embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 910, the processing device determines configuration parameters for one or more operations performed by the sequencer component 140A. The configuration parameters are based on a memory type of a memory component 112A(1) that is associated with the controller 115. The operations can relate to enforcing timing requirements for the particular type of the memory component 112A(1). As such, in some embodiments, the configuration parameters can include timing parameters that vary based on the type of the memory component 112A(1), different generation of the memory component 112A(1), and the like. The configuration parameters can also include the rules used to reorder operations. The memory component 112A(1) can be included in a package 130A along with the sequencer component 140A. The sequencer component 140A and the memory component 112A(1) can be communicatively coupled. The controller 115 can be coupled via a SerDes interface with the sequencer component 140A that is external to the controller 115.

The processing device can determine the configuration parameters for the operations performed by the sequencer component 140A in a number of ways, similar to how the configuration parameter to be used in the ECC operation is determined with reference to FIG. 6. For example, in block 912, the processing device can receive, from the host system 120, a first data structure (e.g., a table) including the configuration parameter for the operations performed by the sequencer component 140A based on the specific type of the memory component 112A(1). In another example, in block 914, the processing device can access, in the local memory 119, a second data structure including the configuration parameter for the operations performed by the sequencer component 140A. In yet another example, in block 916, the processing device can query the sequencer component 140A to obtain the configuration parameter to be used in operations. Additionally or alternatively, in some embodiments, the processing device can query the sequencer component 140A for the type of the memory component 112A(1), and use the received response with any of the above techniques described.

At block 920, the processing device sends the configuration parameters and/or any data to be written to the sequencer component 140A. In some instances, the configuration parameters and/or the data can be stored in the local memory 119 (e.g., memory buffer), and the processing device can transmit the configuration parameters and/or the data stored at the memory buffer to the sequencer component 140A through the output pins of the controller 115.

The sequencer component 140A can use the configuration parameters to perform operations. For example, the configuration parameters can include timing requirements for the type of the memory component 112A(1) and the processing device can sequence an order of operations to perform on the memory component 112A(1) based on the timing requirements. In addition, the configuration parameters can include rules based on commands and addresses included in instructions to reorder the sequence of operations. As described above, the sequencer component 140A can maximize the bandwidth between the sequencer component 140A and the memory component 112A(1) by enforcing the timing requirements and using the rules to reorder the sequence of operations.

Figure 10:
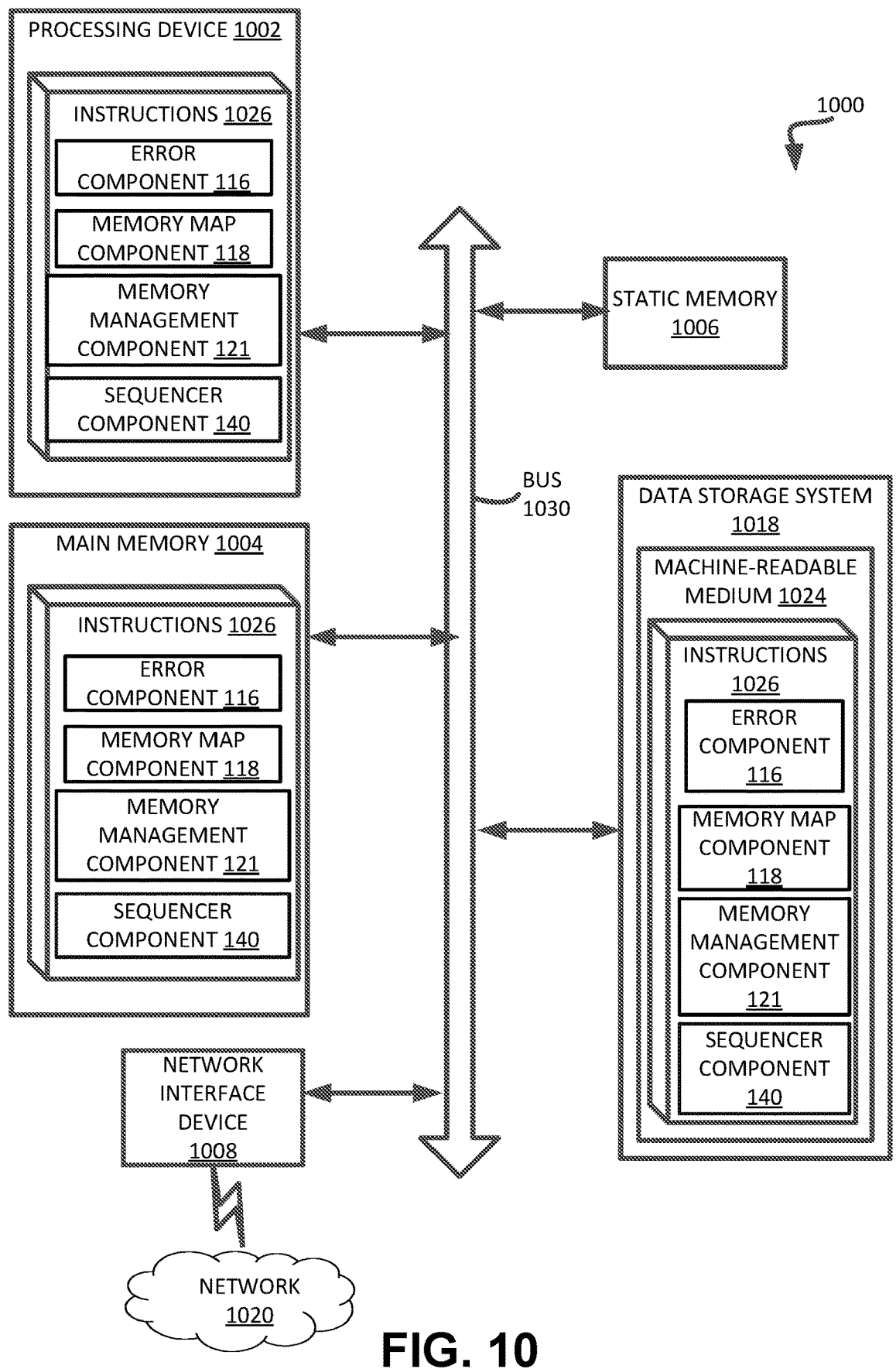
FIG. 10 is a block diagram of an example computer system in which embodiments of the present disclosure may operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error component 116, memory map component 118, and/or memory management component 121 of FIG. 1) or of a sequencer component 140A to 140N of FIG. 1. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 602 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In one embodiment, the instructions 1026 include instructions to implement functionality corresponding to an error component 116, a memory map component 118, a memory management component 121, and/or a sequencer component 140A to 140N of FIG. 1. While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving an instruction at a sequencer of a plurality of sequencers that are collocated within a single package external to a memory system controller, wherein each sequencer of the plurality of sequencers interfaces with one or more respective memory components, the instruction indicating a sequence of memory access operations; and
performing, by a processing device of the sequencer, a sequencing operation, on at least one respective memory component, wherein performing the sequencing operation comprises scheduling a corresponding time for issuing each operation of the sequence of memory access operations to the at least one respective memory component.

2. The method of claim 1, wherein the sequencing operation comprises one or more of: interfacing with the one or more respective memory components via a protocol; or enforcing operation timing requirements for the at least one respective memory component.

3. The method of claim 1, wherein the sequencer, and the memory system controller are operatively coupled via a serializer/deserializer (SerDes) interface.

4. The method of claim 1, wherein the sequencer interfaces with the at least one respective memory components via a protocol that is based on a first memory type.

5. The method of claim 4, further comprising: receiving a further instruction at a second sequencer, wherein the further instruction indicates a another sequence of memory access operations, and wherein the further instruction is received from the memory system controller of a memory sub-system that is coupled to the second sequencer and located outside the single package.

6. The method of claim 5, wherein the second sequencer is to interface with another one or more respective memory components via another protocol that is based on a different memory type.

7. The method of claim 5, wherein the sequencer corresponds to a first independent silicon, the one or more respective memory components correspond to a first independent die, and the first independent silicon and the first independent die are included in the single package, and wherein the second sequencer corresponds to a second independent silicon, the another one or more respective memory components correspond to a second independent die, and the second independent silicon and the second independent die are included in the single package.

8. The method of claim 1, wherein traces between the sequencer and the at least one respective memory components within the single package are shorter than a trace between the sequencer and the memory system controller.

9. A system comprising: a plurality of memory components; and a plurality of sequencers that are collocated within a single package external to a memory system controller, wherein each sequencer of the plurality of sequencers interfaces with one or more respective memory components of the plurality of memory components, wherein a sequencer of the plurality of sequencers is configured to: receive, from the memory system controller, an instruction to perform a sequence of memory access operations; and perform a sequencing operation, on at least one respective memory component, wherein to perform the sequencing operation, the sequencer schedules a corresponding time for issuing each operation of the sequence of memory access operations to the at least one respective memory component.

10. The system of claim 9, wherein the sequencing operation comprises one or more of:
  interface with the one or more respective memory components via a first protocol; or
  enforce operation timing requirements for the one or more respective memory components.

11. The system of claim 9, wherein the sequencer component and the memory system controller are operatively coupled via a serializer/deserializer (SerDes) interface.

12. The system of claim 9, wherein the one or more respective memory components comprise a first memory type, and the sequencer component is to interface with the one or more respective memory components via a protocol that is based on the first memory type.

13. The system of claim 12, wherein the system further comprises: a second sequencer, wherein the second sequencer is located in another package, and the second sequencer is operatively coupled to one or more respective second memory components within the another package and the second sequencer is operatively coupled to the memory system controller, the second sequencer to: receive a second instruction from the memory system controller; and perform a second operation based on the second instruction on at least one of the one or more second respective memory components in the another package.

14. The system of claim 13, wherein the one or more second respective memory components comprise a second memory type different than the first memory type, and the second sequencer is to interface with the second memory type via a protocol that is based on the second memory type.

15. The system of claim 9, wherein traces between the sequencer and the one or more respective memory components within the single package are shorter than a trace between the sequencer and the memory system controller.

16. The system of claim 9, wherein the sequencer corresponds to an independent silicon, the one or more respective memory components corresponds to an independent die, and an independent silicon and the independent die are included in the single package.

17. A system comprising: a plurality of memory components; and a plurality of sequencers that are collocated within a single package external to a memory system controller, wherein each sequencer of the plurality of sequencers interfaces with one or more respective memory components of the plurality of memory components, wherein a sequencer of the plurality of sequencers is configured to: receive, from the memory system controller, an instruction to perform a sequence of memory access operations; and perform a sequencing operation, on at least one respective memory component, wherein performing the sequencing operation comprises scheduling a corresponding time for issuing each operation of the sequence of memory access operations to the at least one respective memory component.

18. The system of claim 17, wherein the instruction comprises a code word and the operation comprises dividing the code word into portions and issuing commands to store the portions at the one or more respective memory components.

19. The system of claim 18, wherein the sequencer is further to: receive a second instruction from the memory system controller that is external to the system; determine a second operation to perform on the at least one respective memory component based on the second instruction; determine that the second operation is to be performed prior to the operation based on a rule; and perform the second operation on the at least one respective memory component prior to the operation.

20. The system of claim 17, wherein the sequencer component is further to determine timing of when to perform the operation based on timing requirements for a memory type of the at least one respective memory component.

* * * * *